Jan. 2, 1951
W. E. BEARD
2,536,414
COMBINATION FLOAT AND DEPTH REGULATOR
FOR FISHING TACKLES
Filed Oct. 4, 1948
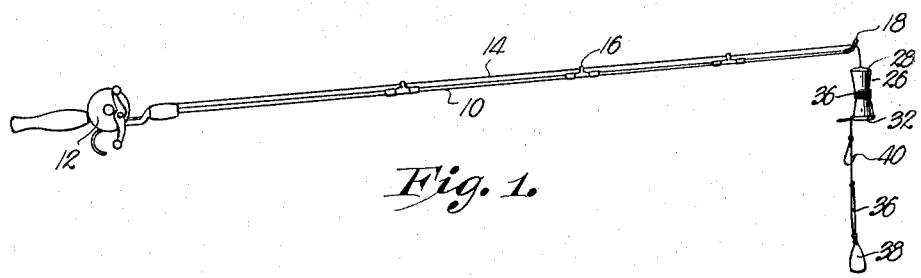
Fig. 1.
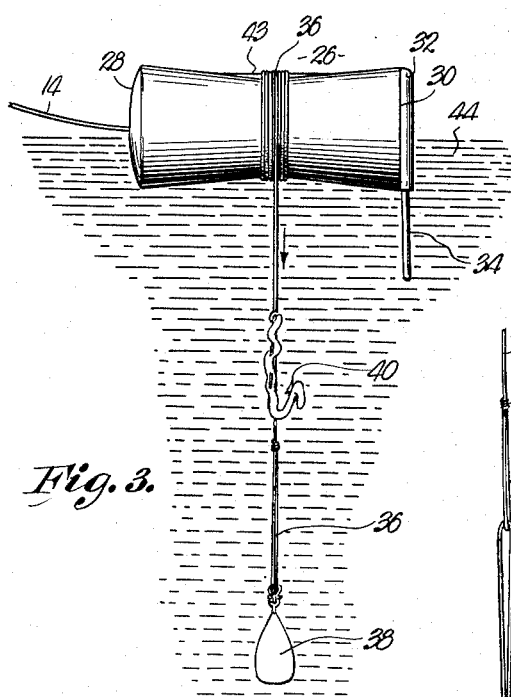
Fig. 3.
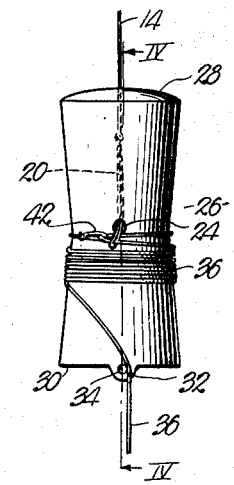
Fig. 2.
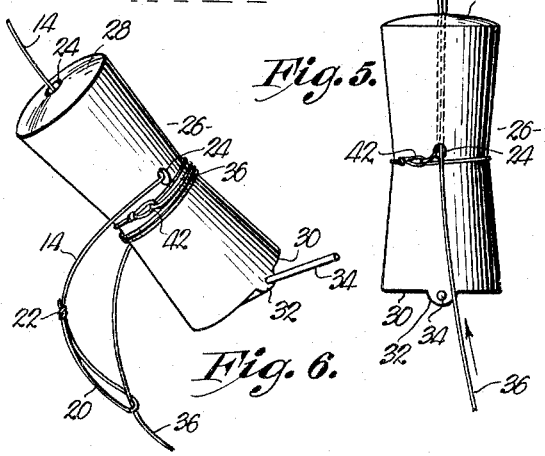
Fig. 5.
Fig. 6.
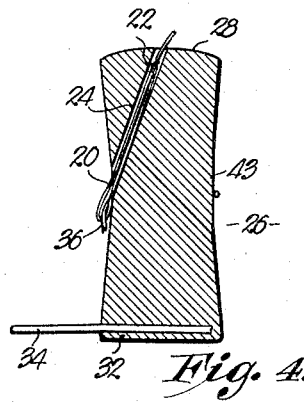
Fig. 4.
INVENTOR.
William E. Beard
BY
ATTORNEY.

Patented Jan. 2, 1951

2,536,414

UNITED STATES PATENT OFFICE 2,536,414

COMBINATION FLOAT AND DEPTH REGULATOR FOR FISHING TACKLE

William E. Beard, Stilwell, Kans.

Application October 4, 1948, Serial No. 52,632

1 Claim. (Cl. 43—43.11)

This invention relates to the field of sports in the nature of fishing equipment, the primary object being to provide fishing tackle having a specially formed float and line assembly capable of facilitating casting irrespective of the depth at which the fisherman desires to position the fish hook in the waters being fished, the assembly being inherently capable of regulating such depth of fishing.

The most important object of this invention is to provide fishing equipment having a specially formed buoyant body of elongated character and adapted to receive the outermost free end of the fishing line in wound relationship thereto and provided with means for loosely supporting said end of the line for holding the same in a wound condition during the casting operation, said means being also capable of automatically releasing the end of the line when the float hits the water, whereby unwinding takes place through descent of the sinker and rotation of the float upon the surface of the water.

Another important object of this invention is to provide a float of the above mentioned character having an opening formed therein for receiving that end of the line attached to the fishing pole or rod, said line being provided with a loop on the free end thereof for receiving that portion of the line extending from the float to the hooks and sinker whereby, upon "reeling in" of the line, the hook-sinker portion thereof automatically doubles upon itself as the float reaches the end of the pole or rod.

Another object of this invention is the provision of a fishing float of double frusto-conical configuration, with the portion of least diameter thereof being disposed intermediate the ends of the float to the end that the wound line thereabout cannot slip from the ends of the float during the casting operation.

A further object of this invention is to provide a float as above set forth having one end thereof formed in the shape of a dome, whereby the float freely rotates within the water without interference by that portion of the fishing line upon which it rotates.

A further object of this invention is to provide a fishing float adapted to receive one end of a fishing line having a hook and sinker thereon and provided with a laterally extending pin adjacent one end thereof for receiving the line after the same has been wound about the float in resting relationship thereon for holding the line against unwinding during casting of the tackle.

Other objects of this invention relate to the manner in which the main line of the fishing tackle is provided with a loop in the free end thereof passing through the opening formed in the float; the way in which the said loop of the main line is coiled about the bight of another line secured to the float and having a hook and sinker mounted thereon; the manner in which the depth of fishing may be regulated by a winding operation of the hook-sinker line about the float; and the general configuration of the float itself, making all of the above objects possible.

More minor objects will be made clear or become apparent as the following specification progresses, reference being had to the accompanying drawing, wherein:

Fig. 1 is a side elevational view of the rod and reel assembly showing the improved float made in accordance with the present invention operatively secured thereto and in a position ready for casting.

Fig. 2 is an enlarged view similar to that shown in Fig. 1 of the float per se illustrating one side of the float at right angles to that side of Fig. 1.

Fig. 3 is an enlarged view of the float per se showing the same on the water at the beginning of the line unwinding operation.

Fig. 4 is a longitudinal cross-sectional view of the float.

Fig. 5 is a side elevational view similar to that shown in Fig. 2 showing the position of the lines at the beginning of the take-up operation, after the float has come into engagement with the rod; and Fig. 6 is a perspective view of the float, showing the manner in which one of the lines is wound about the float to shorten the same.

In Fig. 1 of the drawing, there is shown for illustrative purposes only, a conventional rod 10, having a reel 12 mounted thereon in the usual manner. This reel 12 has wound therearound a line 14 that extends from reel 12 outwardly in parallelism with rod 10 through a plurality of guide eyes 16.

The rod 10 also has a conventional tip 18 at the outermost end for slidably receiving the line 14. The outermost free end of the line 14 extending beyond tip 18 is provided with a loop 20 shown most clearly in Figs. 2 to 6 inclusive, a knot 22 being provided in line 14 to prevent slippage of loop 20. This looped end of the line 14 passes through an elongated opening 24 formed in a float broadly designated by the numeral 26 in the manner illustrated in Figs. 2, 4 and 6.

Float 26 is otherwise a solid body formed from any suitable buoyant material such as plastic and is cast or otherwise produced in the particular configuration illustrated in the drawing. It is clear that this float 26 is generally elongated and shaped to present a double frustum. In other words, float 26 constitutes a pair of end-to-end integral frusto-conical sections having the smaller ends thereof in proximity. Thus, in cross section, the float 26 is circular throughout substantially its entire length, with the sides thereof converging from both ends as the longitudinal center of float 26 is approached. The area of least diameter, therefore, in float 26 is substantially midway between the ends thereof.

For purposes hereinafter made more clear, one end 28 of float 26 is slightly dome-shaped, while the opposite end 30 thereof is provided with a transverse boss 32 integral therewith. The longitudinal axis of boss 32 is perpendicular to the longitudinal axis of float 26 and has embedded therein, one end of an elongated pin 34. The opposite end of the pin 34 projects a distance beyond the proximal side wall of the float 26.

It is apparent, of course, that means other than use of a boss 32, may well be provided for mounting the laterally-extending pin 34 upon the float 26. As illustrated clearly in Figs. 4 and 6 of the drawing, one end of the opening 24 is within the dome-shaped end 28 of float 26 and substantially on the longitudinal axis of float 26. Opening 24 projects at an angle from end wall 28 and with respect to the longitudinal axis of float 26 opening in the side of float 26 adjacent a point substantially midway between end walls 28 and 30. This last-mentioned end of the opening 24 is on the same side of float 26 as that portion of pin 34 extending from the float 26.

It is also notable, particularly in Figs. 3 and 4 of the drawing, that the pin 34 is slightly offset with respect to a perpendicular relationship with the longitudinal axis of float 26, the same angling outwardly toward a plane through the end wall 30 for purposes hereinafter more fully set forth.

A second line 36 is provided with a casting sinker or other weight 38, at the free end thereof suitably tied thereon in the usual manner, together with a fish-engaging hook 40 intermediate its ends. The particular type of hook or other lure that is used and the numbers thereof is immaterial to this invention. That end of line 36 opposite to the sinker 38 is provided with a loop 42 for slidably receiving the bight of line 36 after the same has been looped and drawn taut about the float 26 next adjacent the area of least diameter thereof. It is to be preferred that the line 36 project laterally from the float 26 at a point next adjacent the proximal end of opening 24 in the manner shown in the drawing. A rib 43 formed on float 26 intermediate the ends thereof in diametrically-opposed relationship to the end of opening 24 at the side of float 26, serves as a stop for the knot-forming loop 42 to prevent relative rotation of line 36 and float 26. The loop 20 of the line 14 is coiled about the line 36 between loop 42 of the latter, and hook 40 in the manner illustrated in Fig. 2 of the drawing.

Assuming all parts to be formed and mounted in the manner above set forth with float 26 disposed between hook 40 and the tip end 18 of rod 10, the operation is as follows:

Prior to casting, the fisherman arranges line 14 with the free end of loop 20 projecting only slightly beyond the opening 24 adjacent the loop 42. He thereupon grasps the line 36 and winds the same about the float 26 near the center thereof, as clearly set forth in Fig. 2 of the drawing. After substantially all of the line 36 is so wound about the float 26, the same is laid across the outwardly projecting portion of pin 34 in such manner (see Fig. 2) as to normally prevent unwinding of the line 36.

Fig. 1 shows the manner in which the line 36 lies across pin 34 with only a short length thereof hanging below float 26. The assembly is now ready for use in the casting operation since float 26 is disposed next adjacent the tip 18 of rod 10. During the casting operation, the parts of the assembly will remain in the condition shown in Figs. 1 and 2 with the line 36 wound about float 26 until such time as float 26 strikes the surface of fishing water 44. Float 26 thereupon, assumes the position illustrated in Fig. 3 of the drawing with its longitudinal axis substantially horizontal. As soon as float 26 strikes the surface of water 44, the inherent weight of sinker 38 will start the rotative action of float 26 to move pin 34 toward a downwardly projecting position where line 36 freely slides from pin 34. The assembly is now in the position illustrated in Fig. 3 of the drawing and obviously, as sinker 38 descends in water 44 by force of gravity, unwinding of line 36 will take place because of free rotation of float 26 in water 44 and on a substantially horizontal axis. This rotating action will continue until line 36 is completely extended and because of the arcuate contour of end wall 28, line 14 will not interfere with such float rotation. When the fisherman is ready to reel in the line 14, either with or without a fish on hook 40, float 26 will rise from water 44 and assume approximately the position shown in Fig. 4 of the drawing. As soon as end 28 of float 26 reaches the tip 18 of rod 10 and is stopped thereby, the loop 20 of line 14 will progress within opening 24 toward end 28 thereof. As loop 20 moves from within opening 24, it will carry therewith the line 36 as illustrated in Fig. 5 of the drawing. One end of the line 36 remains taut by virtue of the slip-knot attachment thereof to float 26, whereupon line 36 doubles upon itself as shown in Fig. 5. This action will continue as reel 12 is operated to draw in line 14 until such time as hook 40 reaches the opening 24, or until such time as line 36 reaches reel 12. This, of course, depends upon the length of line 36 and consequently, the depth of fishing.

Obviously, since one end of line 36 is secured tightly to float 26, the same cannot wind about reel 12. It has heretofore been assumed that the full length of line 36 is being used. In the event the fisherman desires to dispose hook 40 at a lesser depth within water 44, he then pulls outwardly on loop 20, as shown in Fig. 6 of the drawing, grasps the line 36 between loop 20 and loop 42 and wraps line 36 around the float 26 until the desired length of line 36 is reached. It is clear in Fig. 6, that when loop 20 is again drawn into the opening 24, the depth of fishing will be determined by the distance on line 36 between loop 20 and hook 40. With the depth of fishing so regulated, the casting and reeling in operation is as above described.

Through actual use, it has been determined that the precise shape of the float 26 is highly material because, during the rotative action of float 26, as shown in Fig. 3 of the drawing, the convolutions of line 36 on float 26 must not move toward either end of float 26 and become entangled either with pin 34 or line 14. It has also been determined through use, that the precise slight inclination outwardly of pin 34 is essential in order to assure the slipping off of line 36 from pin 34 when float 26 hits water 44. Through such inclination of pin 34, as well as the proper choosing of the length thereof, line 36 will not entangle with pin 34 and will freely move therefrom as contemplated.

It has been found that irrespective of the weight of float 26, its size, shape and other considerations, and irrespective of other details with respect to the weight of sinker 38 and the like, pin 34 should extend from float 26 approximately one inch in order to assure satisfactory operation.

It is apparent from the foregoing that a fisherman may easily and quickly select the depth at which he wishes to fish and may easily cast in the usual manner to great distances outwardly into a lake or river, regardless of how long he may wish line 36 to be. Both in the casting operation and in the reeling in operation, there is not a long objectionable length of fishing line extending from tip 18 of rod 10 to the sinker 38.

While it has been assumed throughout that the assembly just described is to be used with a rod and reel assembly, it is apparent that the operation of the device would be much the same and the advantages equally applicable if an ordinary pole were used and "still" fishing was the desire of the operator.

Such changes and modifications as fairly come within the scope of this invention, are contemplated hereby.

Having thus described the invention, what is claimed as new and desired to be secured by Letters Patent is:

In fishing tackle of the kind described, a fishing line adapted for connection to a pole; a second line having a sinker thereon; and a float interconnecting said lines, said float being secured to said fishing line for rotation as the float rests on a body of liquid, whereby to unwind the second line through descent of said sinker in the liquid when said second line is in coiled position about the float, said float having an opening therethrough for receiving the proximal end of said fishing line, and said end of the fishing line being looped about the second line whereby the latter is pulled through the opening as the float is held by the tip of the pole during inward pulling of the fishing line on said pole.

WILLIAM E. BEARD.

REFERENCES CITED

The following references are of record in the file of this patent:

UNITED STATES PATENTS

| Number | Name | Date |
|---|---|---|
| 2,019,630 | Peeso | Nov. 5, 1935 |
| 2,041,322 | Cantini | May 19, 1936 |
| 2,413,371 | Parker | Dec. 31, 1946 |